United States Patent [19]

Tanaka

[11] Patent Number: 5,343,026
[45] Date of Patent: Aug. 30, 1994

[54] MAGNETIC CARD READER/WRITER WITH SELECTABLE FREQUENCIES RELATIVE TO MOTOR SPEED FOR VARIABLE RECORDING DENSITIES

[75] Inventor: Yasuo Tanaka, Moriyama, Japan

[73] Assignee: Omron Corporation, Kyoto, Japan

[21] Appl. No.: 858,017

[22] Filed: Mar. 26, 1992

[30] Foreign Application Priority Data

Mar. 26, 1991 [JP] Japan .................................. 3-026733

[51] Int. Cl.⁵ ...................... G06K 7/08; G06K 13/00; G06K 13/08
[52] U.S. Cl. .................... 235/449; 235/475; 235/480
[58] Field of Search ................... 360/2; 235/449, 475, 235/477, 480, 481, 482, 493

[56] References Cited

U.S. PATENT DOCUMENTS 4,304,992  12/1981  Kobayashi et al. ................ 235/493
4,833,310  5/1989  Shimamura et al. ................ 235/493

FOREIGN PATENT DOCUMENTS 361296  4/1990  European Pat. Off. .
387809  9/1990  European Pat. Off. .

OTHER PUBLICATIONS

Patent Abstracts of Japan, vol. 12, No. 112 (P-687), Apr. 9, 1988.

*Primary Examiner*—Donald Hajec
*Assistant Examiner*—T. N. Forbus Jr.
*Attorney, Agent, or Firm*—Dickstein, Shapiro & Morin

[57] ABSTRACT

A magnetic card writing circuit is disclosed which enables the recording density of a recorded card to be selected, as desired, independently of the speed of a card conveying motor.

4 Claims, 2 Drawing Sheets

MAGNETIC CARD READER/WRITER WITH SELECTABLE FREQUENCIES RELATIVE TO MOTOR SPEED FOR VARIABLE RECORDING DENSITIES

FIELD OF THE INVENTION

This device relates to a magnetic card reader/writer for magnetic recording media, such as magnetic cards and prepaid cards, on which information is written and recorded magnetically.

DISCUSSION OF EXISTING TECHNOLOGY

Magnetic card reader/writers are well known in the art. Such devices are shown, for example, in Japanese Patent Nos. 1-69145 and 1-413803, the disclosures of which are incorporated herein by reference.

An example of the configuration of an existing magnetic card reader/writer is shown in FIG. 2.

This existing magnetic card reader/writer is constructed as follows. Reversible DC motor 24, which conveys the magnetic card, is connected to the output stage of motor control circuit 21 through lines 22 and 23. Tachometer generator 25, which measures the speed of reversible DC motor 24, is directly connected to that motor. The output pulses from this tachometer generator are amplified by amplifier 26. The circuit is designed in such a way as to obtain write-in clock pulses for writing information on the magnetic card. Signals for forward and reverse rotation are applied to the motor control circuit 21 through lines 27 and 28. These signals, relayed through the motor control circuit 21, cause the reversible DC motor 24 to rotate in a forward or reverse direction.

The magnetic head (not pictured) is connected to output line 29 of the amplifier 26 by way of the magnetic head control circuit. The magnetic gap in this head comes in contact with the surface of the magnetic recording medium on the magnetic card.

In this existing device, the r.p.m. of the motor 24 and, concomitantly, the rate at which the card travels and the synchronized output pulses, are obtained from the tachometer generator 25. Thus the existing card reader/writer offers the advantage that the information to be recorded can be written at a recording density which is fixed with respect to the magnetic recording medium on the card being conveyed by the motor 24. On the other hand, the output pulses are produced by the tachometer generator 25 at a rate set by the r.p.m. of motor 24, and so the recording density is ordinarily set at a fixed value which cannot be changed at the user's discretion.

Today many kinds of magnetic cards are widely used in many fields. There is, however, a potential risk that the magnetic cards can be copied relatively easily, because most of the recording densities used on the cards are well known.

SUMMARY OF THE INVENTION

In light of the above, the object of this invention is to provide a magnetic card reader/writer in which the recording density with respect to the magnetic recording medium on the card can be changed at the user's discretion. This is accomplished by furnishing the card reader/writer with a means to generate clock pulses for writing information on the card which supplies the clock pulses independent of the r.p.m. of the motor.

A device constructed in accordance with the invention comprises a magnetic card reader/writer which is equipped with a motor to convey a magnetic card; a means for controlling the motor which can drive the motor in forward or reverse rotation; and a means for generating clock pulses for writing in information which can be set to the desired recording density for the magnetic card independently of the rotational speed of the motor.

With this device, a magnetic card is conveyed by a motor furnished for that purpose which is controlled by the control device. Information is written onto the magnetic recording medium of the card at a recording density which corresponds to the frequency of the write-in clock pulses produced by the pulse generator furnished for that purpose. Because the means used to generate the write-in clock pulses generates pulses at a rate independent of the r.p.m. of the motor, the frequency is not related to the revolution of the motor.

As a result of this design, the density with which information is written onto the magnetic recording medium of the card can be changed at the user's discretion. Information can be written in at densities unique to this invention which were utterly impossible to achieve with previous magnetic card readers/writers.

DETAIL DESCRIPTION OF THE INVENTION

We shall now give a detailed explanation of this invention with reference to the appended drawings.

Figure 1:
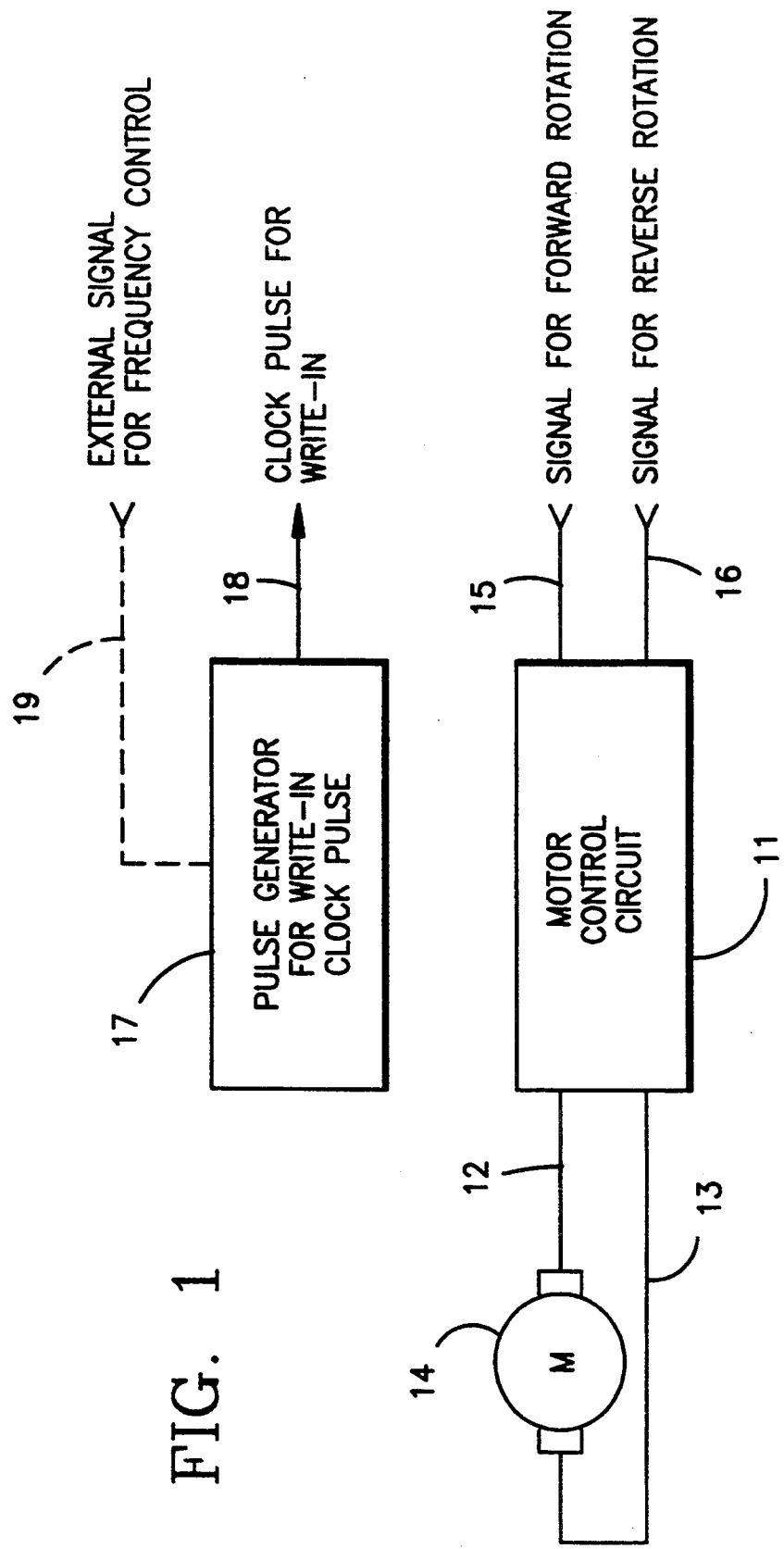
FIG. 1 is a block diagram illustrating the configuration of the magnetic card reader of this invention.
Figure 2:
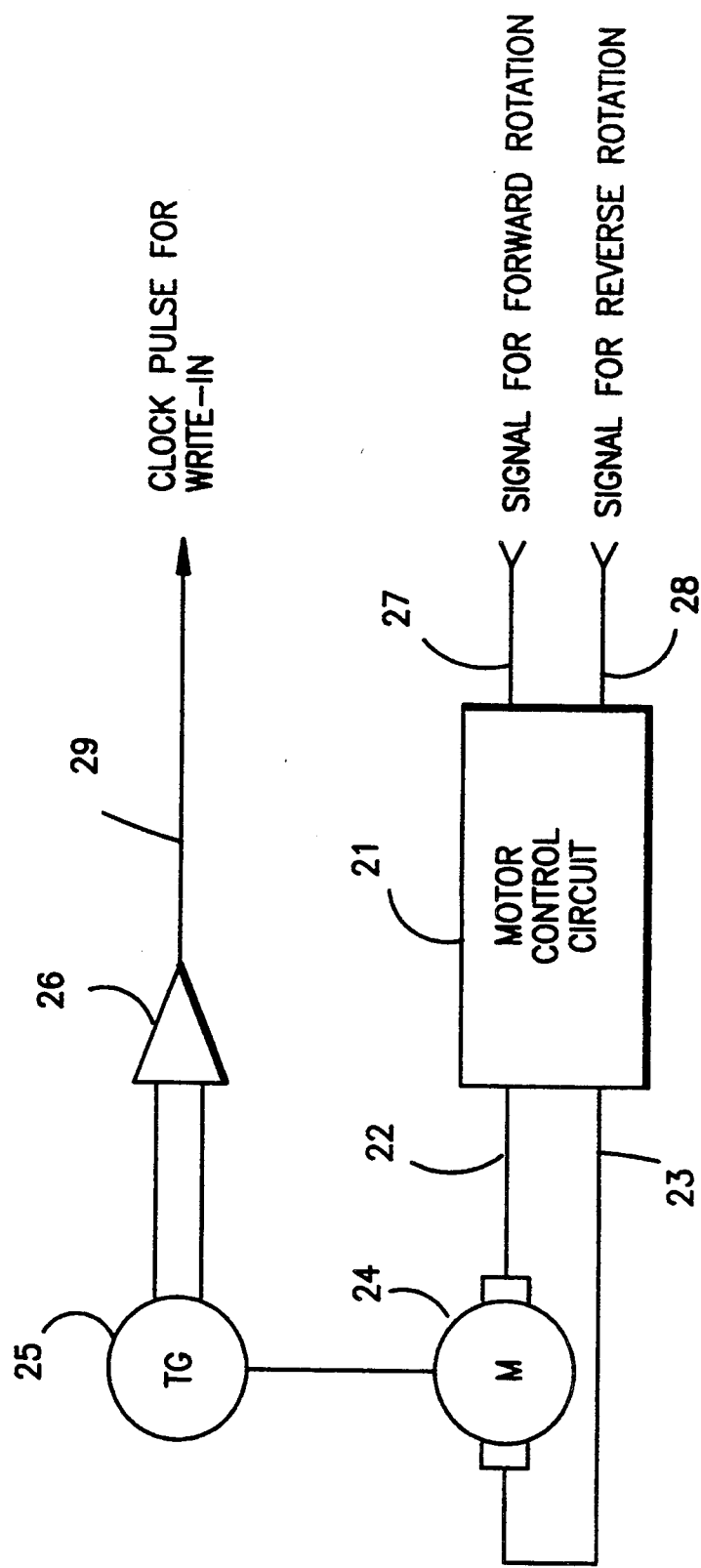
FIG. 2 is a block diagram illustrating the configuration of an existing magnetic card reader.

FIG. 1 illustrates a magnetic card reader/writer constructed in accordance with the invention. It may be used in connection with the magnetic card reader/writer structures disclosed in Japanese Patent Nos. 1-369145 and 1-413803. Reversible DC motor 14, which conveys the magnetic card, is connected to the output stage of motor control circuit 11 through lines 12 and 13. Signals for forward and reverse rotation are applied to the motor control circuit 11 through lines 15 and 16. These signals, relayed through the motor control circuit 11, cause the reversible DC motor 14 to rotate in a forward or reverse direction.

Further, pulse generator 17 generates clock pulses for writing information on a card at a rate which is independent of the r.p.m. of the reversible DC motor 14 and unrelated to the angular position of that motor. Pulse generator 17 is constructed with a frequency setting means so that the frequency of pulse generation can be set at a desired value. Output line 18 from pulse generator 17 is connected to the magnetic head (not pictured) by way of the magnetic head control circuit.

The frequency at which pulse generator 17 generates pulses may also be set by means of an external frequency control signal applied from connection line 19.

The manner in which a magnetic card reader/writer constructed in this fashion operates is as follows.

The magnetic card (not pictured) is conveyed by conveyor motor 14, which is controlled by the motor control circuit 11. Information is written onto the magnetic recording medium of the card by way of output line 18, the magnetic head control circuit and the magnetic head. The recording density with which the information is written on the medium corresponds to the clock pulse frequency for writing-in information which is furnished by the pulse generator 17. This pulse generator 17 generates clock pulses for writing information which have a frequency independent of the r.p.m. of motor 14 and, concomitantly, of the rate of travel of the magnetic card. Thus the frequency at which the pulses are generated is unrelated to the revolution of the motor.

As a result of this design, the density with which information is written onto the magnetic recording medium of the card can be changed at the user's discretion. Information can be written in at selected densities unique to this invention which were utterly impossible to achieve with previous magnetic card readers/writer.

The recorded density can be determined, upon reproduction, by the signal reproducing equipment from the recorded information itself. For example, a flag could be recorded on the card indicating the recording density or an electronic circuit can be provided for automatically determining recording density.

Although a preferred embodiment of the invention has been described and illustrated, it should be apparent that modifications can be made without departing from the spirit and scope of the invention. Accordingly, the invention is not limited by the foregoing description, but is only limited by the scope of the appended claims.

I claim:

1. A magnetic card reader/writer comprising:
a reversible motor for conveying a magnetic card in a forward and reverse direction;
means for controlling said motor to operate in forward and reverse rotation to thereby convey said card in said forward and reverse directions, respectively;
means for generating clock pulses for writing information on said card, said generating means generating clock pulses at a selectable frequency independent of a rotation speed of said motor, said selectable frequency creating a desired recording density for said magnetic card that is changeable relative to the rotational speed of said motor.

2. A magnetic card reader/writer as claimed in claim 1, wherein said generating means sets a frequency of said clock pulses in response to an external frequency control signal applied thereto.

3. A magnetic card reader/writer as claimed in claim 1, wherein said desired recording density is variable relative to said generating means and said magnet card.

4. A magnetic card reader/writer as claimed in claim 3, wherein said desired recording density is changeable by a user.

* * * * *